(No Model.)　　　　　　　　　　　　　　　　　2 Sheets—Sheet 1.
D. A. ASKEW.
AUTOMATIC STOCK FEEDER.
No. 600,056.　　　　　　　　　　Patented Mar. 1, 1898.
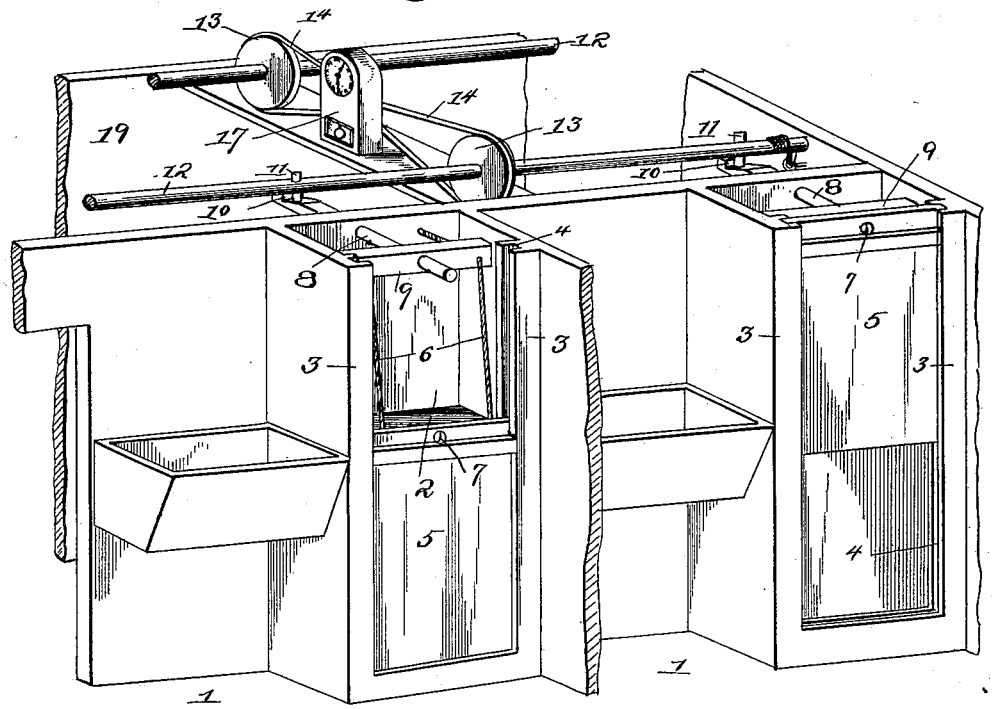
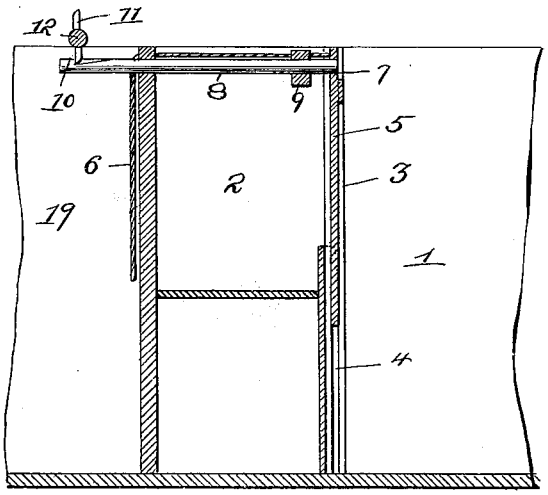
Witnesses　　　　　　　　　　　　　　　Inventor
Wm. H. Edwards Jr.　　　　　　　　　David A. Askew
Victor J. Evans　　　　　　By John Wedderburn
　　　　　　　　　　　　　　　　　　　Attorney
THE NORRIS PETERS CO., PHOTO-LITHO., WASHINGTON, D. C.

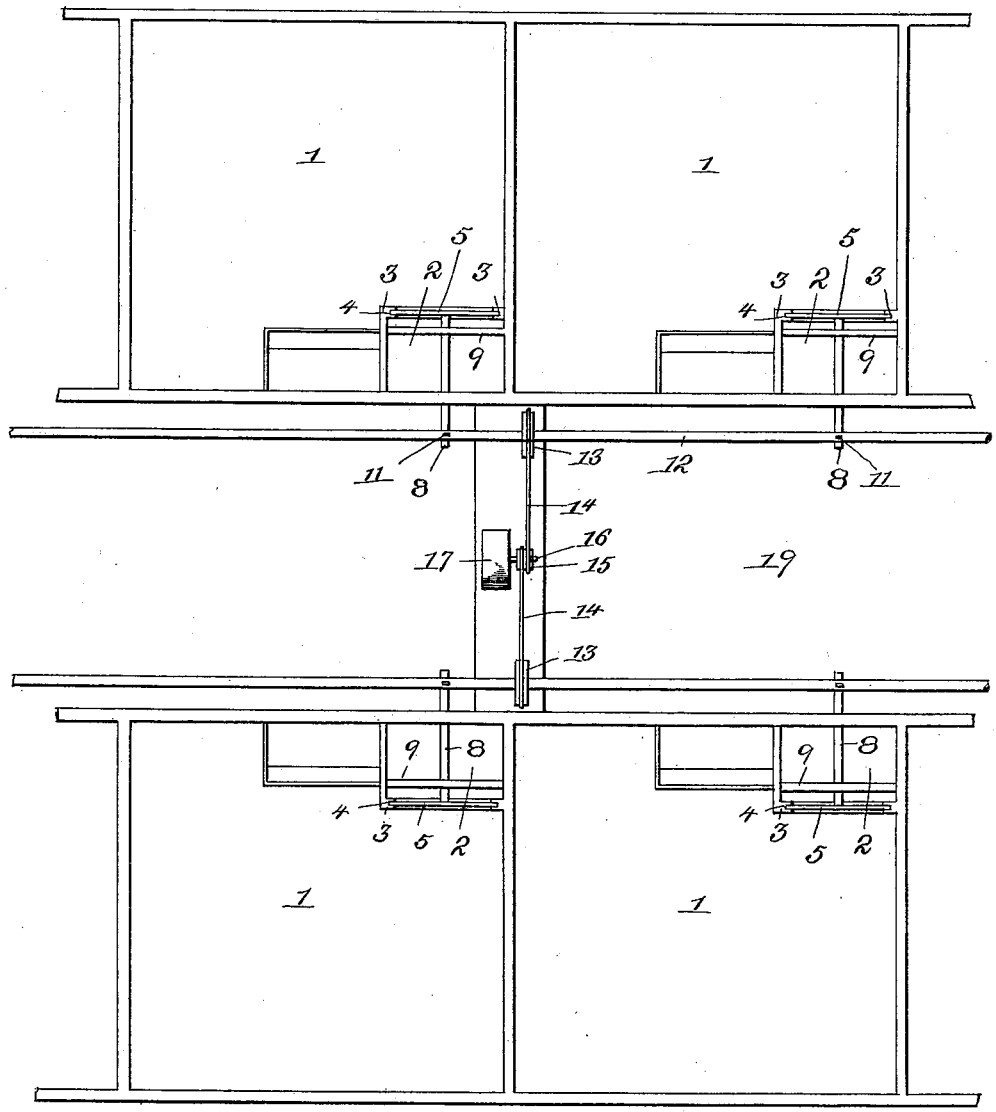

UNITED STATES PATENT OFFICE.

DAVID ANDREW ASKEW, OF COLERAINE, NORTH CAROLINA.

AUTOMATIC STOCK-FEEDER.

SPECIFICATION forming part of Letters Patent No. 600,056, dated March 1, 1898.

Application filed July 16, 1897. Serial No. 644,775. (No model.)

*To all whom it may concern:*

Be it known that I, DAVID ANDREW ASKEW, of Coleraine, in the county of Bertie and State of North Carolina, have invented certain new and useful Improvements in Automatic Stock-Feeders; and I do hereby declare the following to be a full, clear, and exact description of the invention, such as will enable others skilled in the art to which it appertains to make and use the same.

My invention relates to new and useful improvements in automatic stock-feeders; and it consists in the combination and arrangement of parts that will be hereinafter fully described.

The object of the invention is to provide a device of the character indicated which will be especially simple in construction, economical, and efficient in operation.

A further object of the invention is to provide a stock-feeder in which the feed for the stock will be put in the bins from which it is eaten and said bins closed to prevent the animal from reaching the food until a predetermined time, when gates will be dropped, exposing the food and permitting the animal to eat the same.

Other objects and advantages of the invention will become apparent in the course of the following description, and the points of novelty will be particularly pointed out in the claim.

I am enabled to accomplish the object of my invention by the simple means illustrated in the accompanying drawings, in which—

Figure 1 represents a perspective view of the portion of the stable constructed in accordance with my invention and showing one feed-bin therein open and the other closed for convenience of illustration. Fig. 2 is a central vertical section taken through one of the stalls, and Fig. 3 is a top plan view showing the general arrangement of the stalls.

Referring to the drawings, the numeral 1 indicates the box-stalls of the stable, and the numeral 2 indicates the feed-bins therein, which in the present instance are located between two uprights 3, which are provided at their inner front edges with grooves or guideways 4, in which are adapted to slide sliding doors 5, which are adapted to be elevated by means of ropes or cords 6, secured to the upper edges of said doors or gates and may pass to any convenient place to be grasped by the hand to lift the said gates. The doors are provided in their upper portions with openings 7, which are adapted to receive the ends of horizontal sliding arms 8, which pass through the front of the stall- and through transverse supports 9 above the feed-bins, said arms 7 being adapted to hold the doors in elevated position to prevent the animals from reaching the food, and said arms are provided at their rear ends with heads or projections 10, adapted to be engaged by lugs or projections 11 upon shafts 12, which shafts have keyed thereon pulley-wheels 13, around which pass bands or cords 14, which extend to and around the small wheel 15 upon a shaft 16, which forms the main shaft of the striking mechanism of a clock 17.

It is my purpose to arrange the stalls in the stables in the manner illustrated in the drawings—that is, two stalls or any number thereof opposite each other, with two shafts extending throughout the length of the stable in front of the stalls, each of said shafts being provided with a pulley-wheel, and a clock located upon any suitable support between the stalls, the numeral 19 indicating the main passage between the rows of stalls, and it will be seen that a single clock can operate any number of sliding doors for the purpose described.

Having described the essential mechanism of my stock-feeder, I will now proceed to describe its operation, assuming the sliding doors to be elevated and the bins closed. At a predetermined time the clock mechanism will cause the shafts to be partially rotated through the medium of the bands or cords 14, and the lugs or projections on said shafts will be brought in contact with the projections on the longitudinal arms 7 in the sliding doors, which, as soon as said arms are withdrawn, are dropped and occupy the space below the bins, thus exposing the feed and permitting the animals to reach the same.

I do not desire to be understood as limiting myself to the precise construction shown in the drawings, as many modifications will suggest themselves and may be made without departing from the spirit of the invention, and it will be seen that in the present device I am enabled to do away with additional bins which support the feed above the bins from which it is eaten, as is common in devices of this character.

Having thus described my invention, what I claim as new, and desire to secure by Letters Patent, is—

In a device of the character described, the combination with the striking mechanism of the clock, of a series of feed-bins, sliding trap-doors normally closing said bins, shafts journaled in suitable bearings and adapted to be partially rotated by the clock mechanism at a predetermined time, pins or projections on said shaft, sliding arms moving in suitable guides and provided at one end with a head or projection, and having their other ends in engagement with the trap-doors to keep the same in elevated or closed position, the heads on said bars adapted to be engaged by the lugs or projections on the shafts to withdraw the arms from the doors, and permit the same to drop and expose the food when the shaft is rotated or partially rotated, substantially as and for the purpose set forth.

In testimony whereof I have signed this specification in the presence of two subscribing witnesses.

DAVID ANDREW ASKEW.

Witnesses:
WM. E. EVANS,
W. H. HARRELL.